United States Patent
Perego et al.

(10) Patent No.: US 9,837,183 B2
(45) Date of Patent: Dec. 5, 2017

(54) HIGH-VOLTAGE ELECTRIC CABLE

(71) Applicant: PRYSMIAN S.P.A., Milan (IT)

(72) Inventors: Gabriele Perego, Milan (IT); Roberto Candela, Milan (IT); Donald Parris, Milan (IT)

(73) Assignee: PRYSMIAN S.P.A., Milan (IT)

(*) Notice: Subject to any disclaimer, the term of this patent is extended or adjusted under 35 U.S.C. 154(b) by 0 days.

(21) Appl. No.: 15/111,346

(22) PCT Filed: Jan. 21, 2014

(86) PCT No.: PCT/EP2014/051080
§ 371 (c)(1),
(2) Date: Jul. 13, 2016

(87) PCT Pub. No.: WO2015/110139
PCT Pub. Date: Jul. 30, 2015

(65) Prior Publication Data
US 2016/0336090 A1 Nov. 17, 2016

(51) Int. Cl.
  H01B 7/00  (2006.01)
  H01B 3/44  (2006.01)
  C08K 7/28  (2006.01)
  H01B 7/02  (2006.01)

(52) U.S. Cl.
  CPC ............. *H01B 3/441* (2013.01); *C08K 7/28* (2013.01); *H01B 7/0275* (2013.01)

(58) Field of Classification Search
  CPC .. H01G 7/02; H01G 7/14; H01G 9/02; H01G 9/04; H01G 9/14
  USPC ........ 174/36, 110 R, 120 R, 120 SC, 121 R, 174/121 SC
  See application file for complete search history.

(56) References Cited

U.S. PATENT DOCUMENTS

| | | | | |
|---|---|---|---|---|
| 4,001,128 A | * | 1/1977 | Penneck | H01B 3/30 174/110 SR |
| 4,130,450 A | * | 12/1978 | Bahder | H01B 7/282 156/47 |
| 4,383,132 A | * | 5/1983 | Bentvelsen | H01B 9/027 174/102 SC |
| 6,759,595 B2 | | 7/2004 | Goehlich et al. | |

(Continued)

FOREIGN PATENT DOCUMENTS

| | | | |
|---|---|---|---|
| EP | 0 304 699 | 3/1989 | |
| GB | 2 209 167 | 5/1989 | |
| JP | WO2011/158420 A * | 12/2011 | ............... H01B 9/02 |

(Continued)

OTHER PUBLICATIONS

International Search Report from the European Patent Office for International Application No. PCT/EP2014/051080, dated Oct. 10, 2014.

(Continued)

*Primary Examiner* — William H Mayo, III
(74) *Attorney, Agent, or Firm* — Finnegan, Henderson, Farabow, Garrett & Dunner, L.L.P.

(57) ABSTRACT

A high-voltage alternate current electric cable [is provided. In the electric cable,] having at least one metallic electric conductor is surrounded by at least one extruded insulating layer. The insulating layer includes from 1 wt % to 30 wt % of a void-containing filler. The filler is made of particles having an average diameter up to 50 pm dispersed in an insulating polymeric material.

13 Claims, 1 Drawing Sheet

(56) References Cited

U.S. PATENT DOCUMENTS

| | | | |
|---|---|---|---|
| 6,903,263 B2* | 6/2005 | Perego | H01B 3/441 |
| | | | 174/110 R |
| 8,257,782 B2* | 9/2012 | Perego | H01B 3/441 |
| | | | 174/102 R |
| 2002/0127401 A1* | 9/2002 | Perego | C08F 255/02 |
| | | | 428/375 |
| 2006/0185889 A1 | 8/2006 | Negle | |
| 2007/0299160 A1 | 12/2007 | Delanaye et al. | |
| 2010/0063172 A1* | 3/2010 | Negle | B29C 39/006 |
| | | | 521/142 |
| 2013/0025909 A1 | 1/2013 | Perego et al. | |
| 2013/0092416 A1* | 4/2013 | Saito | H01B 3/28 |
| | | | 174/120 SC |

FOREIGN PATENT DOCUMENTS

| | | |
|---|---|---|
| WO | WO 2004/112055 | 12/2004 |
| WO | WO 2006/041433 | 4/2006 |
| WO | WO 2011/092533 | 8/2011 |

OTHER PUBLICATIONS

Deb Gagari; "Ferranti Effect in Transmission Line", International Journal of Electrical and Computer Engineering (IJECE), vol. 2, No. 4, pp. 447-451, (2012).

Technical Report on Using EHV Cables as Alternatives to Overhead Lines, Tokyo Electric Power Company, pp. 1-16, (2009).

Liu et al.; "The Propagation of Partial Discharge Pulses in a High Voltage Cable", Proc. of AUPEC/EECON eds, Sep. 26-29, Darwin, Australia, pp. 287-292, (1999).

* cited by examiner

HIGH-VOLTAGE ELECTRIC CABLE

CROSS REFERENCE TO RELATED APPLICATION

This application is a national phase application based on PCT/EP2014/051080, filed Jan. 21, 2014, the content of which is incorporated herein by reference.

FIELD OF THE INVENTION

The present invention relates to a high-voltage electric cable. In particular, the present invention relates to a high-voltage alternate current electric cable for power transmission and distribution in underground power lines.

BACKGROUND OF THE INVENTION

Overhead power lines are the structures traditionally used in electric power transmission and distribution to transmit high-voltage alternate current (HVAC) electric energy along long distances. The cables in overhead power lines essentially consist of one or more metallic conductors (usually three or four) suspended by towers. In overhead power lines, the insulation of the conductors is provided by air.

Throughout the present description, the term "high-voltage" refers to a voltage above 30 kV.

HVAC electric energy can also be transmitted by underground power lines.

Underground power lines can be an attracting alternative to overhead power lines for several reasons, such as, for example, landscape aesthetics, abatement of emissions of electromagnetic fields into the surrounding area, and reduction of risk of damage caused by storms, high winds, ice, snow storms, falling trees and so on.

Unlike in overhead power lines, in underground power lines air does not provide for insulation and, hence, the metallic conductor must be otherwise insulated.

Generally, HVAC cables for underground power lines are provided with a metallic electric conductor (usually aluminium or copper) surrounded—from the radially innermost layer to the radially outermost layer—with an inner semiconductive layer, an insulating layer and an outer semiconductive layer. Such layers are usually made of polymeric material. Because of the presence of an insulating layer, the cables for underground power lines are known as "insulated cables".

Due to the presence of said insulating layer, HVAC insulated cables have a capacitance higher than that of cables used in overhead lines where the insulation is provided by the surrounding air.

As from Gagari D., International Journal of Electrical and Computer Engineering (IJECE) Vol. 2, No. 4, August 2012, pp. 447-451, the higher capacitance promotes, in an electric power transmission line, the so called "Ferranti effect", i.e. in an AC electric power transmission line the receiving end voltage is greater than the sending end voltage. This effect is more pronounced as the longer the line and the higher the voltage applied, and gives place to undesirable temporary overloads.

As reported, for example, in "Technical Report on using EHV cables as alternatives to Overhead Lines", 2009, Tokyo Electric Power Company, even by compensating for the capacitance at each end of the cable, the voltage somewhere in the centre of the cable can become unacceptably high, which will prematurely age the cable insulation amongst other things. Compensation for the cable's capacitance takes the form of large coils or reactors which connect the cable cores to earth. For example, a 400 kV HVAC underground power line about 160 km long, required 24 reactors to fully compensate the cable capacitance.

The Applicant faced the problem to provide low capacitance HVAC insulated cables for power transmission and distribution.

It is known that low capacitance insulated cables can be obtained by increasing the insulation thickness. However, this solution has several drawbacks, such as reduction of flexibility, increase of cable weight, reduction of cable length that can be transported, thus requiring more joints, and an overall increase of manufacturing and deployment costs.

It is also known that low capacitance insulated cables can be obtained by lowering the dielectric constant (or electric permittivity, $\in_r$) of the polymeric material that is used to form the insulating layer.

The dielectric constant ($\in_r$) of a polymeric material is known to be directly proportional to its polarity and density.

With regard to the polarity, special polymers, for example fluorinated polymers, have a polarity and, as a consequence, a dielectric constant lower than polyolefin polymers generally employed as base material for a HVAC insulating layer. However, such special polymers are notably more expensive than polyolefin polymers and their use is disadvantageous from the economical point of view.

With regard to the density, it can be decreased by expanding the polymeric material. However, an expansion inevitably creates voids and microvoids in the insulating layer, which are at the origin of partial discharge phenomena.

As from, for example, "The Propagation of Partial Discharge Pulses in a High Voltage Cable", ZZ. Liu et al., 1999, in Proc. Of AUPEC/EECON eds, September 26-29; Darwin, Australia, Northern Territory, Australia, pp. 287-292, partial discharge (PD) activity in high voltage cables is caused by various defects, such as voids. Gas-filled cavities or voids are formed in solid insulation during manufacture, installation or operation. When the electric stress in the void exceeds the breakdown strength of gas within the void, partial discharges will occur. PDs will gradually degrade and erode the dielectric materials, eventually leading to final breakdown.

Partial discharge phenomena assume particular relevance in alternating current transmission and distribution because of the continuous reversal of the electric charge.

Thus, a prejudice exists in the art with regard to decrease the density of the insulating layer by creating voids, or even microvoids, especially in cables for high-voltage alternating current power lines.

U.S. Pat. No. 6,759,595 deals with outdoor termination for a high voltage cable, comprising an insulator body for receiving the high voltage cable, a filling compound provided within the insulator body. Hollow "micro-spheres" filled with gas can be provided in the filling compound to compensate volume, for example during temperature changes. The document states that the gas in the hollow cavities in an insulating medium presents a higher risk of partial discharge.

GB 2 209 167 relates to a composite material of low dielectric constant, having electric properties improved by incorporation of minute hollow spheres in a fibrous polytetrafluoroethylene (PTFE). The formed article of mixture is sintered. When the composite material is used as an electric insulating material, it is desirable from the standpoint of effect of incorporation to select the amount of hollow spheres approximately in the range of from 50 wt % to 95 wt % based on the amount of the composite material.

EP 1 639 608 discloses high voltage insulating materials in solid and liquid form, which are provided in particular for use in high voltage generators for example for radio-technology and computer tomography. The high voltage insulating component is hard and foam-like, and comprises a polymer matrix and a filler, wherein the filler is formed by hollow spheres, wherein the hollow spheres are made of a further material and are filled with a gas. The hollow spheres may be made for example of glass. Hollow spheres preferably have a diameter of for example up to about 100 µm. The dielectric constant of the insulating material may be reduced further the greater the fraction of gas in the insulating material. This fraction increases as the number and diameter of the hollow spheres increase. The insulating materials are produced in the form of high power injection molded parts.

The inclusion of hollow sphere or particles into an insulating component should also take into account the process for manufacturing thereof. While the insulation of a discrete end-product is typically produced by moulding, the insulating layer of a continuous end-product, like a cable, is produced by extrusion where shear and pressure stress can be challenging for some material.

SUMMARY OF THE INVENTION

The Applicant has now surprisingly found that the capacitance of cables for high-voltage alternating current (HVAC) power lines can be reduced by reducing the dielectric constant of the insulating layer thereof through an insulating layer density reduction by introducing a void-containing filler in the polymer of the insulating layer without impairing the electric properties of the insulating layer.

In particular, the Applicant has found that dielectric losses increase and/or partial discharge phenomena are not observed in the extruded insulating layer of a high voltage cable with void-containing particles provided that the size and amount of such particles are properly selected.

In these conditions, the insulating polymer comprising a void-containing filler does not negatively affect other electric properties of the insulating layer, such as insulation resistance, thermal stability, dielectric strength, mechanical strength, resistivity and chemical resistance.

Thus, in a first aspect, the present invention relates to a high-voltage alternate current electric cable comprising a metallic electric conductor surrounded by an extruded insulating layer, wherein said insulating layer comprises from 1 wt % to 30 wt % of a void-containing filler made of particles having an average diameter up to 50 µm dispersed in an insulating polymeric material.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

In the present description, the term "cable core" or "cable core" means the cable portion comprising an electrical conductor, an insulating layer surrounding said conductor and, optionally, at least one semiconducting layer, for example an inner semiconducting layer surrounding the conductor in a radially internal position with respect to the insulating layer and/or an outer semiconducting layer surrounding the insulating layer.

In the present description and claims the term "void-containing filler" means a material in form of particles which comprise empty space(s) inside them, for example, hollow particles, porous particles or particles developing a spongy structure after expansion.

When the particles of the void-containing filler are not substantially spherical, the "average diameter" is the diameter of the smallest sphere containing the substantially non-spherical particle.

Preferably, the insulating polymeric material is selected from the group comprising polyolefins, including both homopolymers of a single olefin and copolymers of two or more different olefins.

More preferably, the insulating polymeric material is selected from the group comprising: polyethylene (PE), such as high density PE (HDPE), medium density PE (MDPE), low density PE (LDPE), linear low density PE (LLDPE), very-low density PE (VLDPE); polypropylene (PP); ethylene/propylene rubber (EPR); ethylene/propylene/diene rubbers (EPDM); ethylene/α-olefin copolymers; and copolymers thereof or mixtures thereof.

In a preferred embodiment, the insulating layer comprises from 5 wt % to 25 wt %, more preferably from 10 wt % to 20 wt %, and most preferably from 14 wt % to 18 wt %, of void-containing filler.

In a preferred embodiment, the particles of the void-containing filler have an average diameter up to 40 µm, more preferably up to 30 µm, and most preferably up to 20 µm.

In a preferred embodiment, the particles of the void-containing filler have an average diameter of at least 1 µm, more preferably of at least 10 µm.

Advantageously, the particles of the void-containing filler have an average diameter of from 15 µm to 20 µm.

The Applicant noted that it is important to control the average diameter of the particles of the void-containing filler to be dispersed in the insulating layer according to the present invention. In particular, the Applicant noted that when the average diameter of the particles is higher than 50 µm, partial discharge phenomena may occur in the insulating layer. When the average diameter is lower than 1 µm, the particles can break during the extrusion process of the insulating layer; in addition, the use of so fine particles can give place to managing and pollution issues in a manufacturing plant.

The particles of the void-containing filler can be hollow particles, such as hollow spheres. Hollow spheres suitable for the invention can be filled with air, but preferably they are filled with an inert gas, for example $N_2$ and/or $CO_2$. Alternatively, the particles of the void-containing filler can be porous particles, such as silicon dioxide aerogel particles; or particles expandable at the insulation manufacturing temperature and capable of developing a spongy structure after expansion, for example polymeric particles containing a foaming agent.

In the present description and claims, as "insulation manufacturing temperature" is meant the temperature of extrusion of the insulating polymer material.

The particles of the void-containing filler can be made of inorganic or organic materials. Preferably, inorganic materials suitable for the particles of the invention are glass or silica aerogel. Although not being bound to any theory to explain the present invention, the Applicant believes that, because the dielectric constant of the glass particles ($\epsilon_r$=3.7 typically) is higher than that of the insulating polymeric material of the insulating layer, in particular of polyolefins ($\epsilon_r$=2.2-2.4), the electrical stress at the surface of glass hollow spheres or of the porous silica aerogel particles decreases and, as a consequence, the electrical properties of the insulating layer are not impaired. Advantageously, organic materials suitable for the particles of the invention are polymers with a dielectric constant lower than that of the insulating polymeric material, such as polypropylene ($\epsilon_r$=1.5-2.2), polymethyl methacrylate ($\epsilon$=2.6), poly-4-methylpentene ($\epsilon_r \cong$2.12) or a fluorinated polymer. The organic particles of the void-containing filler can be in form of hollow spheres, porous or expandable particles. In the latter cases, the particles are advantageously made of poly-4-methylpentene containing a suitable processing agent, in particular supercritical carbon dioxide.

When the particles of the void-containing filler are hollow particles, they preferably have a wall thickness up to 0.50 µm, and more preferably up to 0.40 µm. In a preferred embodiment, the hollow particles have a wall thickness of at least 0.10 µm, and more preferably of at least 0.20 µm. Particles having a wall thickness of from 0.20 µm to 0.50 µm are suitable for bearing the extrusion pressure during the insulation manufacturing without being damaged.

The HVAC electric cables of the invention can be a multicore cable—having, for example, three cable cores—or a single core cable.

BRIEF DESCRIPTION OF THE FIGURES

The present invention will be better understood by reading the following detailed description, given by way of example and not of limitation, to be read with the accompanying drawings, wherein.

DETAILED DESCRIPTION OF THE INVENTION

Figure 1:
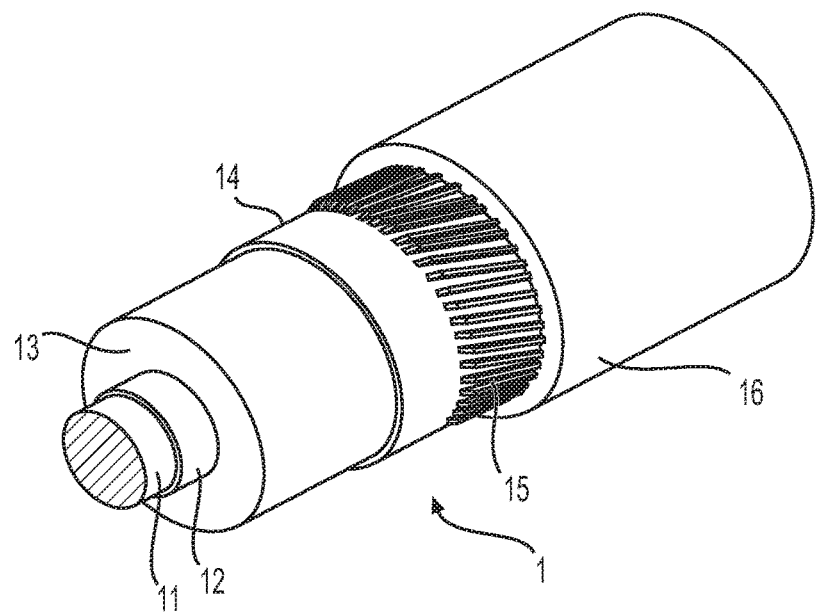
FIG. 1 shows a perspective view of a HVAC electric cable according to a first embodiment of the present invention.

FIG. 1 shows a first embodiment of an HVAC cable according to the present invention.

According to this embodiment, cable 1 comprises a metallic conductor 11, an inner semiconductive layer 12, an insulating layer 13 and an outer semiconductive layer 14, which constitute the cable core. The cable core is surrounded by a metal shield 15, and an outer sheath 16.

The metallic conductor 11 can be made of copper, aluminium or composites thereof. The metallic conductor 11 can be in form of a rod or can be made of wires stranded together by conventional technique.

The cross sectional area of the metallic conductor 11 is determined in relationship with the power to be transported at the selected voltage. For example, the cross sectional areas for the HVAC cables according to the present invention range from 30 mm$^2$ to 3,000 mm$^2$.

The insulating layer 13 according to the present invention is preferably made of a polyolefin polymeric material, for example a polyethylene homopolymer or copolymer or a polypropylene copolymer. In case of polyethylene, the polymeric material is advantageously cross-linked. In the case of a polypropylene copolymer, the insulating layer is preferably based on a polypropylene matrix intimately admixed with a dielectric fluid, as disclosed in WO 02/03398, WO 02/27731, WO 04/066318, WO 07/048422 and WO 08/058572.

The glass hollow spheres suitable for the present invention are marketed, for example, by 3M Company, St. Paul, Minn.

The inner semiconductive layer 12 and the outer semiconductive layer 14 are also made of suitable polymeric materials. According to a preferred embodiment, the polymeric material for the inner semiconductive layer 12 and/or the outer semiconductive layer 14 is similar to that of the insulating layer 13 added with an electro-conductive filler such as carbon black, for example electro-conductive furnace black or acetylene black, so as to confer semiconductive properties to the polymer material, in particular a volumetric resistivity value, at room temperature, of less than 500 Ωm, preferably less than 20 Ωm. Typically, the amount of carbon black can range between 1 wt % and 50 wt %, preferably between 25 wt % and 40 wt %, relative to the weight of the polymer.

The polymeric material for the inner semiconductive layer 12 and/or the outer semiconductive layer 14 can be the same of the insulating layer 13 or chemically compatible thereto.

The use of the same polymeric material for both the insulating layer 13 and at least one of the semiconducting layers 12 and/or 14 is particularly advantageous, since ensures excellent adhesion between adjacent layers and, as a consequence, a good electrical behaviour. This advantage is more evident when the insulating layer 13 and the semiconducting layers 12 and/or 14 are made of the same polymeric material because the electrical filed, as well as the risk of partial discharge, is high at the interface between said two layers.

As represented in FIG. 1, the metal shield 15 is made in the form of metallic wires, for example copper wires, helically wound around the outer semiconductive layer 14.

According to an alternative embodiment, the metal shield is made of a continuous metal tube or sheet, preferably aluminium or copper, surrounding the outer semiconductive layer. In this embodiment, the metal shield is welded or sealed using an adhesive material so as to make it watertight.

The outer sheath 16 preferably is made of polymeric material, such as polyvinyl chloride (PVC) or polyethylene (PE).

The cable according to the present invention can be manufactured by processes known to the person skilled in the art.

In particular, the insulating layer can be produced by (a) mixing an insulating polymeric material with an amount from 1 wt % to 30 wt % of a void-containing filler made of particles having an average diameter up to 50 µm, (b) extruding the resulting polymeric composition onto the metallic conductor, covered with an inner semiconducting layer, and, optionally, (c) cross-linking said polymeric composition.

In the step (a), the void-containing filler is added to the polymeric material when the latter is in form of a molten mass contained in a continuous mixer of Ko-Kneader type (Buss) or of co- or counter-rotating double-screw type; or in a single screw extruder. The resulting mechanical mixture of void-containing filler and insulating polymeric material is extruded (step (b)) onto the metal conductor, covered with an inner semiconducting layer, through an extrusion head comprising at least one extruder. Advantageously, said extrusion head comprises three extruders (triple-head extrusion) for the co-extrusion of insulation layer and semiconductive layers. The co-extrusion gives place to an improved adhesion among the co-extruded layers resulting in a better cable performance.

The cross-linking step (c), if any, can be carried out immediately after the extrusion step, by passing the metallic conductor covered with said layer of polymeric composition through a vulcanising tube.

Other conventional additives that can be added to the polymeric composition of the insulation layer, such as antioxidants, heat stabilizers, processing aids, lubricants, voltage stabilizer additives, antiscorching agents, and mixtures thereof.

The HVAC cable according to the present invention can also be completed by the addition of other protective coverings (armouring), not represented in the figures.

Figure 2:
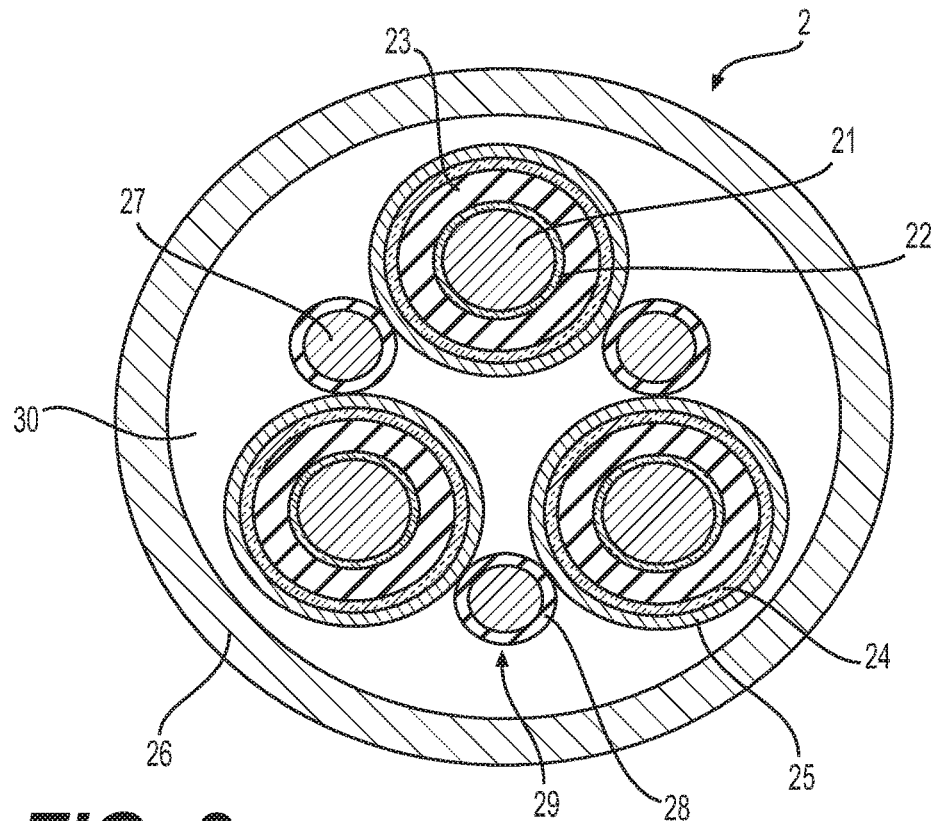
FIG. 2 shows a cross-section view of a HVAC electric cable according to a second embodiment of the present invention.

FIG. 2 shows another embodiment of the HVAC cable according to the present invention. According to this embodiment, cable 2 comprises three cable cores, each comprising a metallic conductor 21, an inner semiconductive layer 22, an insulating layer 23, and an outer semiconductive layer 24. Each cable core is surrounded by a metal shield 25. The three cable cores are stranded and embedded into a filler (or bedding) 30 which, in turn, is surrounded by an outer sheath 26.

In the embodiment represented in FIG. 2, the HVAC cable 2 also comprises three ground conductors 29, each comprising a metallic conductor 27 and an insulating layer 28.

The metallic conductors 21 and 27, the inner semiconductive layer 22, the insulating layers 23 and 28, the outer semiconductive layer 24, the metal shield 25 and the outer sheath 26 can be made of materials already disclosed in connection with cable 1 of FIG. 1 for analogous cable layers.

The present invention will be explained in more detail below by way of examples, which are not intended to be limiting of the present invention.

EXAMPLE 1

The following compositions were prepared with the amounts reported in the following table 1.

As for sample B, low density polyethylene (LDPE) was compounded with hollow glass microspheres in the amounts according to the following table 1 in an open mixer at the temperature of 170° C. The polymeric material was melted in the mixer and the glass microspheres were subsequently added step by step within 20 minutes, by continuous mixing. The material was then collected and grinded.

TABLE 1

| Sample | A(*) | B |
| --- | --- | --- |
| LDPE (g) | 700.00 | 700.00 |
| XLD 6000 (g) | — | 125.00 |

(*)comparative

XLD 6000: hollow glass microspheres having an average diameter of 18 μm, a wall thickness of 0.35 μm and filled with a mixture of $CO_2+N_2$ (manufactured by 3M Company, St. Paul, Minn.).

The density of the samples was measured according to CEI EN 60811-1-3 (2001). The results are disclosed in the following table 2.

TABLE 2

| Sample | A(*) | B |
| --- | --- | --- |
| Density (g/cm³) | 0.914 | 0.762 |

(*)comparative

The analysis showed a density decrease for sample B according to the present invention when compared to the reference sample A.

EXAMPLE 2

The dielectric constant of the samples of Example 1 was measured by a bridge impedance tester LCR HP4284A (Hewlet-Packard) in term of relative permittivity ($\in_r$) at different frequencies. The results are set forth in table 3.

TABLE 3

| Sample | A(*) | B |
| --- | --- | --- |
| $\in_r$ at 50 Hz | 2.41 | 2.34 |
| $\in_r$ at 50 kHz | 2.41 | 2.33 |
| $\in_r$ at 100 kHz | 2.41 | 2.31 |
| $\in_r$ at 300 kHz | 2.43 | 2.31 |
| $\in_r$ at 400 kHz | 2.45 | 2.33 |
| $\in_r$ at 600 kHz | 2.38 | 2.25 |

(*)comparative

The dielectric constant of sample B according to the invention is significantly lower than that of comparative sample A at all of the frequencies tested.

EXAMPLE 3

Sample B of Example 1 was tested in a cell according to CIGRE II method for revealing the possible insurgence of partial discharge phenomena.

Despite the presence of the hollow glass microspheres equivalent to micro-voids in the insulating layer, no partial discharge was detected in one hour up to 15 kV/mm.

The invention claimed is:

1. A high-voltage alternate current electric cable comprising at least one metallic electric conductor surrounded by at least one extruded insulating layer, wherein said insulating layer comprises from 1 wt % to 30 wt % of a void-containing filler made of particles having an average diameter of from 1 μm to 50 μm dispersed in an insulating polymeric material.

2. The high-voltage alternate current electric cable according to claim 1, wherein said polymeric material is selected from polyolefins comprising homopolymers of a single olefin and copolymers of two or more different olefins.

3. The high-voltage alternate current electric cable according to claim 1, wherein said insulating layer comprises from 5 wt % to 25 wt % of said void-containing filler.

4. The high-voltage alternate current electric cable according to claim 3, wherein said insulating layer comprises from 10 wt % to 20 wt % of said void-containing filler.

5. The high-voltage alternate current electric cable according to claim 1, wherein said particles have an average diameter up to 40 μm.

6. The high-voltage alternate current electric cable according to claim 1, wherein said particles have an average diameter of at least 10 μm.

7. The high-voltage alternate current electric cable according to claim 1, wherein said particles have an average diameter of from 15 μm to 20 μm.

8. The high-voltage alternate current electric cable according to claim 1, wherein said particles are selected from hollow particles, porous particles and particles expandable at an insulation manufacturing temperature and capable of developing a spongy structure after expansion.

9. The high-voltage alternate current electric cable according to claim 1, wherein said particles comprise inorganic or organic materials.

10. The high-voltage alternate current electric cable according to claim 9, wherein said inorganic material is glass or silica aerogel.

11. The high-voltage alternate current electric cable according to claim 9, wherein said organic material is a polymer selected from polypropylene, polymethyl methacrylate, poly-4-methylpentene and a fluorinated polymer.

12. The high-voltage alternate current electric cable according to claim 8, wherein said hollow particles have a wall thickness up to 0.50 μm.

13. The high-voltage alternate current electric cable according to claim 12, wherein said hollow particles have a wall thickness of from 0.20 μm to 0.50 μm.

\* \* \* \* \*